March 31, 1970  A. F. STAMM  3,503,654
BRAKE SYSTEM

Original Filed June 15, 1966  5 Sheets-Sheet 1

INVENTOR
ALEX F. STAMM

Strauch, Nolan, Neale, Nies & Bronaugh
ATTORNEYS

March 31, 1970  A. F. STAMM  3,503,654
BRAKE SYSTEM

Original Filed June 15, 1966  5 Sheets-Sheet 2

INVENTOR
ALEX F. STAMM

Strauch, Nolan, Neale, Nies & Bromaugh
ATTORNEYS

March 31, 1970  A. F. STAMM  3,503,654
BRAKE SYSTEM

Original Filed June 15, 1966

INVENTOR
ALEX F. STAMM

ATTORNEYS

March 31, 1970     A. F. STAMM     3,503,654

BRAKE SYSTEM

Original Filed June 15, 1966     5 Sheets-Sheet 4

INVENTOR
ALEX F. STAMM

Strauch, Nolan, Neale, Nies & Bromaugh
ATTORNEYS

FIG. 11

United States Patent Office 3,503,654
Patented Mar. 31, 1970

3,503,654
BRAKE SYSTEM
Alex F. Stamm, Rochester, Mich., assignor, by mesne assignments, to Rockwell Standard Company, Pittsburgh, Pa., a corporation of Delaware
Continuation of application Ser. No. 557,739, June 15, 1966. This application Sept. 11, 1967, Ser. No. 667,004
Int. Cl. B60t 8/06
U.S. Cl. 303—21
11 Claims

ABSTRACT OF THE DISCLOSURE

An automotive braking system in which the rotational velocity of certain wheels, usually the front wheels provides a reference for comparison with the rotational velocity of the other wheels to provide a signal to limit the braking effort said other wheels to a value just below that which will cause said other wheels to lock-up except when said front wheels are first locked.

---

This application is a continuation of application Ser. No. 557,739, filed June 15, 1966, now abandoned.

The present invention relates to motor vehicle brake systems and more particularly to brake control systems for preventing skidding or locking of one or more vehicle wheels as a result of excessive brake application.

It is well known that the braking deceleration of a vehicle is dependent upon the frictional engagement of the wheels with the surface upon which they are rolling. Maximum braking deceleration is generally attained when the applied braking power is just below the value which causes locking and skidding of one or more of the wheels. However, locked wheels resulting from excessive brake application render the vehicle uncontrollable.

When the rear wheels of a vehicle lock up while the front wheels are still rolling during excessive braking, the vehicle tends to spin and a resulting adverse oversteering condition is likely to occur. Front wheel lock-up, on the other hand, results in an understeering condition which tends to cause the vehicle to uncontrollably continue movement in a substantially straight line, assumming that the road surface is essentially level. Since rapid and effective braking of the vehicle speed usually is more essential than maintaining full directional control in an emergency, it thus is desirable to prevent the rear wheels of the vehicle from locking up until the vehicle speed is reduced nearly to zero or until the front wheels lock up.

In operation of vehicle braking systems, the set of wheel brakes at the axle having the lightest axle load tends to lock up before full breaking is obtained on the other set of wheel brakes. This locking condition is caused by uneven static load distribution on the vehicle axles and is augmented by a dynamic load transfer towards the front of the vehicle during braking. The amount of dynamic load transfer is in direct proportion to the rate of deceleration.

Customarily, the variations in static load on the wheels of a vehicle are compensated for by providing different sizes of brake cylinders at the front and rear wheels. In a front engine passenger car or light truck, for example, the front wheel cylinders usually are larger than the rear wheel cylinders to compensate for the greater weight bearing on the front axle. Such variations in wheel cylinder size, however, do not compensate for the dynamic load shift which occurs during braking and which results in the reduction of the load applied to the rear wheels.

The hazardous condition resulting from a wheel lock-up is even more dangerous when the brakes are applied during cornering. Since lock-up of the front wheels results in an understeering condition, the vehicle tends to corner along a circular path of increased radius. A rear wheel lock-up during cornering results in a drastic oversteering condition which suddenly decreases the vehicle path radius, with the rear end of the vehicle tending to spin around the front end. Such a situation may be remedied by an expert driver by cutting the front wheels of the vehicle out of the curve. However, overcorrection is frequent in this type of situation, and it causes the rear end of the vehicle to uncontrollably spin in the opposite direction.

Proper balance of braking power between front and rear wheels is even further complicated in commercial vehicles, and lack of proper balance may lead to highly dangerous situations in commercial vehicles of the unitary type, such as trucks and buses, as well as in vehicles of the articulated type such as semi-tractor trailer combinations and tractor-trailer combinations. Commercial vehicles are often designed with a braking ratio between the front wheels and the rear wheels which is a compromise between loaded and unloaded conditions.

Such a compromise does not insure adequate stability when loaded and provides considerably reduced stability when unladen. This is due to the fact that there is usually a considerable weight change when traveling unladen as compared with traveling with a full load.

When unladen, the breaking force applied to the rear wheels of the vehicle, even during normal brake application, is generally sufficient to lock the rear wheels while the front wheels are still free to rotate. This situation, which is dangerous in an ordinary truck or bus, is even more dangerous when the motor vehicle is a tractor adapted to tow a trailer whose wheels suddenly become locked during emergency brake application. Because of the greatly increased oversteering situation resulting from locking of the rear wheels of the tractor or the wheels of the trailer, the trailer rear end has a tendency to jackknife by spinning around the tractor.

To preclude such dangerous braking situations, the present invention provides a novel brake control system whereby the tendency of the rear wheels of a motor vehicle to lock during brake application is reduced until the front wheels are also locked. The principles of the present invention are applicable to passenger vehicles as well as motor trucks, buses, tractor-trailer combinations, and the like. Briefly stated, the brake system of this invention comprises means for detecting and comparing the tangential or rotational velocity of the set of front wheels with that of the other wheels on the vehicle and means responding to this comparison for reducing the braking effect on the rear wheels when the rate of rotation of the rear wheels lags by a predetermined amount behind the rate of rotation of the front wheels.

The major object of the invention, consequently, is to provide a novel brake control system that automatically reduces the lock-up tendency of one set of wheels of a vehicle before other wheels on the vehicle become locked during brake application.

A more specific object of the invention is to provide a novel brake system wherein the application of brakes to the front wheel set of a vehicle is directly under the control of the driver and wherein application of brakes to the rear wheels of the vehicle is controlled by the rate of front wheel rotation when the average rotational velocity of the rear wheels becomes less than that of the front wheels.

A further object of the invention is to provide a novel brake control device which may be incorporated into existing brake systems without any appreciable modification of the existing system, which is sturdy, which operates independently of wheel size so that differences in wheel sizes on the vehicle is of no consequence, which is easily maintained, and which is substantially fool-proof in operation.

Another object of this invention is to provide a novel brake control system wherein fluid operating pressure for operating the vehicle brakes on one or more axles is rapidly and automatically pulsed to reduce the braking effect applied to the wheels thereon.

Other objects and advantages of the invention will become apparent from the following description and accompanying drawings wherein:

Figure 1:
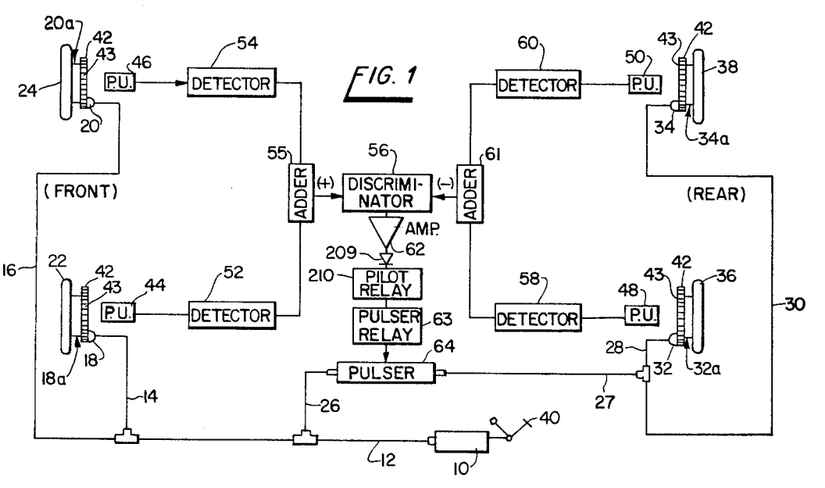
FIGURE 1 schematically illustrated a brake system for a passenger vehicle or the like and incorporating one embodiment of this invention.

Referring now to the drawings, and more particularly to FIGURE 1, the brake system for a passenger vehicle or small truck is shown to comprise a combination master cylinder and hydraulic fluid reservoir assembly 10 of conventional form. The hydraulic cylinder of assembly 10 is connected by a line 12 and branch conduits 14 and 16 to a pair of brake cylinders 18 and 20 for front wheels 22 and 24 of the unshown vehicle. Line 12 is also connected by a conduit 26 to the inlet port of a brake control pulser 64 which will be described in detail later on. The outlet port of pulser 64 is connected by a conduit 27 to a pair of branch conduits 28 and 30. Branch conduits 28 and 30 are respectively connected to a pair of brake cylinders 32 and 34 for the vehicle rear wheels 36 and 38. A brake pedal 40 is operatively connected to assembly 10 in the usual manner.

When pedal 40 is depressed, pressurized hydraulic fluid is fed through line 12 and conduits 14 and 16 to the front wheel brake cylinders 18 and 20 to actuate front wheel brakes 18a and 20a. Depression of pedal 40 also feeds pressurized hydraulic fluid through conduits 26, 27, 28, and 30 to cylinders 32 and 34 to actuate the rear wheel brakes 32a and 34a. Operation of the front and rear wheel brakes in this manner is common and well known in the art.

Brakes 18a, 20a, 32a, and 34a are each shown to comprise the usual brake drum 42 and may be of any suitable, known construction such as, for example, the Rockwell-Standard Stopmaster type. It is to be understood, however, that the present invention is not limited to a certain type of brake.

According to this invention, the tangential or rotational velocity of front wheels 22 and 24 and the tangential or rotational velocity of rear wheels 36 and 38 are detected by providing each wheel drum 42 with notches, discontinuities or teeth 43, and by providing a series of electromagnetic pickup transducers 44, 46, 48 and 50, one for each of the wheels 22, 24, 36, and 38. Transducers 44, 46, 48, and 50 are fixed in place on each associated wheel and may be mounted on the back plate of brakes 18a, 20a, 32a and 34a respectively.

Teeth 43 or the notches between teeth 43 are formed from a suitable magnetic material such as iron, steel, or other material which is attracted by a magnet. This construction thus provides the drum periphery with a series of circumferentially spaced or discontinuous magnetic elements. Each of the transducers 44, 46, 48, and 50 has a core or pole piece located closely adjacent to the drum periphery containing teeth 43. When each wheel is rotated, therefore, teeth 43 move closely past their associated transducers to vary the flux density in the core or pole piece. As a result, transducers 44, 46, 48, and 50 respectively respond to the rotation of wheels 22, 24, 36, and 38 to each produce an undulating, essentially sinusoidal electrical output signal whose frequency, pulsewidth, and amplitude are directly proportional to the tangential velocity and hence the angular velocity of its associated wheel. The magnetic material used to form teeth 43 or the notches therebetween need not be permanently magnetized because transducers 44, 46, 48, and 50 may either be provided with a permanent magnet or be operated on the known variable reluctance principle by using a D.C. polarizing current.

Transducers 44 and 46 are respectively connected to rectifiers or detectors 52 and 54 to supply at their outputs two continuous direct current voltage levels which are proportional to the tangential or rotational velocities of front wheels 22 and 24. The output signals of detectors 52 and 54 are fed to the input of an adder circuit 55 where they are effectively added together and fed to a comparator or discriminator 56.

The undulating or alternating current voltage signals generated by transducers 48 and 50 are, in a similar manner, rectified by detectors 58 and 60. The resulting direct current voltage levels at the output side of detectors 58 and 60 thus are respectively proportional to the tangential or rotational speeds of rear wheels 36 and 38 and are fed into an adder circuit 61 where they are added together and applied to discriminator 56. It will be appreciated that the output signals of adder circuits 55 and 61 may respectively represent the sum or average of the front and rear vehicle wheel sets.

The polarity of the direct current voltage signals fed to discriminator 56 from adder circuits 55 and 61 are so inverted with respect to each other that discriminator 56 produces no output signal if the D.C. input voltage signals are of substantially equal value. Discriminator 56 thus produces an output signal only if the input voltage signals are of unequal value.

In the embodiments shown in the drawings, the voltage output signals of detectors 52 and 54, which represent the tangential or angular speed of front wheels 22 and 24, are arbitrarily polarized positively, and the voltage output signals of detectors 58 and 60, which represent the tangential or angular speed or rear wheels 36 and 38, are arbitrarily chosen as being negative. With this arrangement, the voltage output signal produced by discriminator 56 will be positive if either or both rear wheels 36 and 38 tend to lock up or begin to rotate at a slower speed than front wheels 22 and 24 during brake application.

The output signal of discriminator 56 is fed through an amplifier 62 to a pilot relay 210. Relay 210, as will be described in detail later on controls operation of a pulser relay 63 which, in turn, controls the operation of pulser 64. Relay 210, as will hereinafter be explained in detail, is energized only if the output signal of discriminator 56 is positive, indicating lock-up of either or both of the rear wheels. Energization of relay 210 energizes relay 63, and energization of relay 63 activates pulser 64. When activated, pulser 64 is effective to periodically and repeatedly interrupt fluid communication between conduits 26 and 27. The pressure of hydraulic brake fluid applied to brake cylinders 32 and 34 will thus be pulsated. In this manner, rear brakes 32a and 34a will repeatedly be released and reapplied by activating pulser 64, with the result that rear wheels 36 and 38 tend to resume their normal rotational speed. It is expected that under most current operating conditions it will be possible to omit the pilot relay 210 from the circuit and to direct instead the output signal of the discriminator 56 as amplified by amplifier 62 directly to pulser relay 63 as the pilot relay's only function is to protect pulser relay 63 from excessive current flow. This will also be true of all subsequent circuits described herein.

Activation of pulser 64 continues until the speed of rotation of rear wheels 36 and 38, as detected by transducers 48 and 50, reaches a value substantially equal to the rotational speed of front wheels 22 and 24. When this happens, the negative levels of signals fed to discriminator 56 by detectors 58 and 60 will become substantially equal to the positive voltage levels of signals fed into the discriminator from detectors 52 and 54. The output signal of discriminator 56 will thus be reduced to zero to deenergize relay 63 and, consequently, deactivate pulser 64 to permit cylinders 32 and 34 to operate brakes 32a and 34a in the normal manner.

Details of the circuitry thus far described will be described later on.

Figure 2:
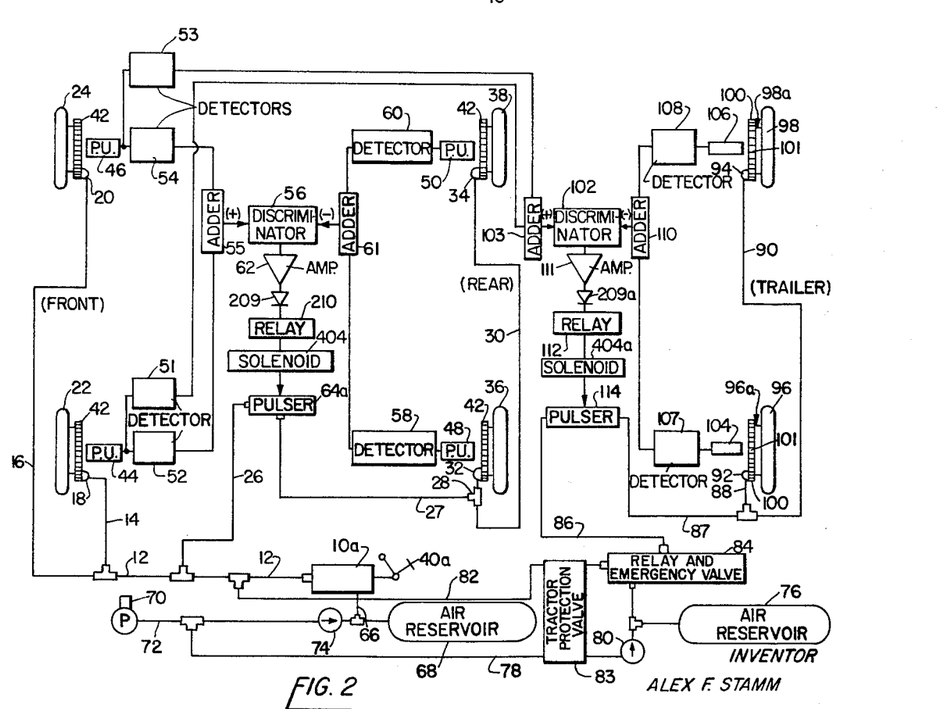
FIGURE 2 illustrates another embodiment of this invention as applied to a motor vehicle towing at least one trailer.
Figure 3:
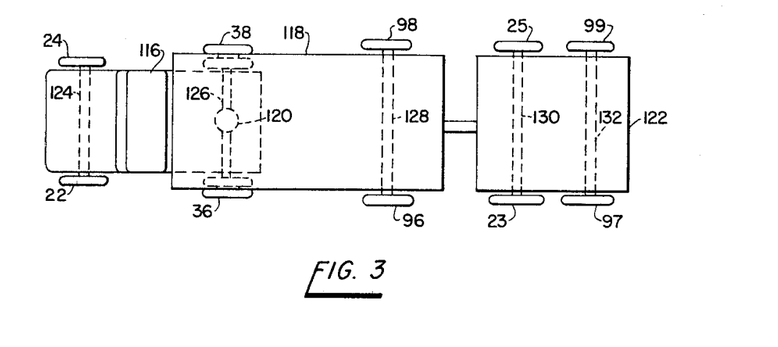
FIGURE 3 is a partially schematic plan view of a semi-tractor trailer combination incorporating a somewhat modified form of the system shown in FIGURE 2.

FIGURE 2 illustrates a modified brake system for use in a typical tractor-trailer combination. To the extent that the systems of FIGURES 1 and 2 are alike, reference characters have been used to identify similar parts. As shown in FIGURES 2 and 3, wheels 22 and 24 are the tractor front wheels, wheels 36 and 38 are the tractor rear wheels, and wheels 96 and 98 are the trailer rear wheels.

In the system of FIGURE 2, supply of compressed air is controlled by a valve 10a which is operated by a pedal 40a. An air reservoir 68, which is suitably mounted on the tractor, is connected by a conduit 66 to the inlet port of valve 10a. The discharge port of a compressor or pump 70 is connected to reservoir 68 by a conduit 72. A check valve 74 contained in conduit 72 blocks reverse fluid flow from reservoir 68 to pump 70. Pump 70 is driven by the unshown tractor engine to charge reservoir 68 with compressed air. Pump 70 also supplies compressed air through a conduit 78 to a trailer-mounted air reservoir 76. A check valve 80 contained in conduit 78 blocks reserve flow from reservoir 76.

When pedal 40a is depressed, compressed air is supplied from valve 10a through line 12 to conduits 14 and 16 for actuating front brake cylinders 18 and 20 in the usual manner. Compressed air is also supplied through conduit 27 through brake control pulser 64a, and through conduit 27 to conduits 28 and 30 for actuating the rear wheel brake cylinders 32 and 34. The construction of pulser 64a will be described in detail later on.

Compressed air supplied through valve 10a is also transmitted through a conduit 82 and through a tractor protection valve 83 to activate a suitable relay and emergency valve 84 from a normally closed position to an opened position. The outlet port of valve 84 is connected by a conduit 86 to the inlet port of another brake control pulser 114. The outlet port of pulser 114 is connected by a conduit 87 to two branch conduits 88 and 90 which are, in turn, connected to brake cylinders 92 and 94 for trailer wheels 96 and 98. Cylinders 92 and 94 respectively form parts of brakes 96a and 98a. When valve 84 is opened, therefore, compressed air is supplied to actuate brakes 96a and 98a.

In the embodiment of FIGURE 2, pulser 64a comprises a solenoid-operated, three-way valve which is actuatable to control the air pressure applied to cylinders 32 and 34. When the summation of rotational or tangential speeds of rear tractor wheels 36 and 38 becomes less than the summation of rotational speeds of front wheels 22 and 24 during brake application, pulser 64a is actuated to interrupt fluid communication between conduits 26 and 27 and to exhaust conduit 27 to atmosphere, thereby reducing the braking power applied by brakes 32a and 34a until wheels 36 and 38 resume speeds which, in summation, substantially equal the sum of the rotational speeds of the front wheels.

Still referring to FIGURE 2, additional rectifiers or detectors 51 and 53 are provided for front wheels 22 and 24 respectively. The output of transducer 44 is electrically connected to the input channels of detectors 51 and 52. The output of transducer 46 is electrically connected to the input channels fo detectors 53 and 54. The output signals of detectors 51 and 53 thus will be the same as detectors 52 and 54 respectively. The output channels of detectors 52 and 54 are electrically connected to adder circuit 55 as previously mentioned. The output channels of detectors 51 and 53 are electrically connected to another adder circuit 103.

Trailer wheels 96 and 98 are also provided with speed sensing transducers 104 and 106 having outputs electrically connected to the input channels of rectifiers or detectors 107 and 108 respectively. The output channels of detectors 107 and 108 are electrically connected to the input channel of an adder circuit 110 whose output, in turn, is electrically connected to a discriminator or comparator 102. Adder circuits 103 and 110 may be the same as adder circuits 55 and 61, and discriminator 102 may be the same as discriminator 56. Also, detectors 107 and 108 may be the same as detectors 58 and 60.

Similar to the tractor wheel brakes, trailer brakes 96a and 98a are each provided with a brake drum 100 having teeth 101. Teeth 101 or the notches therebetween are made of magnetic material. Transducers 104 and 106 are of the same construction as the transducers for the tractor wheels. Transducers 104 and 106 thus will produce undulating, essentially sinusoidal electrical output signals whose frequencies, pulsewidths, and amplitudes are directly proportional to the tangential or rotational speeds of wheels 96 and 98 respectively.

The voltage output of adder circuit 110 is made negative and is fed into discriminator 102 for comparison with the positive voltage signal fed from adder circuit 103. If trailer wheels 96 and 98 start to rotate slower than wheels 22 and 24, the negative voltage signal fed from adder circuit 110 will be less in magnitude than the positive voltage signal supplied from adder circuit 103. The output signal of discriminator 102 thus goes positive as described in the embodiment of FIGURE 1.

The output of discriminator 102 is fed through an amplifier 111 to a relay 112 which is essentially the same as relay 210. Thus when the difference between the summed up speeds of trailer wheels 96 and 98 and the summed up speeds of wheels 22 and 24 reaches a predetermined magnitude the resulting output signal produced by discriminator 102 is sufficient to energize relay 112. Energization of relay 112 activates solenoid 404a which, in turn, activates pulser 114 to relaese the air pressure supplied to brake cylinders 92 and 94. The braking effort applied to the trailer wheels is therefore released until the trailer wheels resume a rate of rotation that equals the rotational rate of front wheels 22 and 24.

From the foregoing, it is apparent that the embodiment of FIGURE 2 can be used to operate a vehicular arrangement as shown in FIGURE 3 wherein a tractor 116 tows a semi-trailer 118 by means of a fifth wheel connection 120 and wherein a four wheel trailer 122 is, for example, towed by being hitched behind semi-trailer 118. Trailer 122 has a front axle 130 and a rear axle 132. Wheels 23 and 25 are mounted on axle 130, and wheels 97 and 99 are mounted on axle 132. Wheels 22 and 24 are mounted on a front axle 124 of tractor 116, and wheels 36 and 38 are mounted on a rear axle 126 of tractor 116. Wheels 96 and 98 are mounted on a rearward axle 128 of semi-trailer 118.

It is apparent that the example of FIGURE 2 may be supplemented so that the electrical signals representing the tangential or rotational velocities of the wheels 22 and 24 on front axle 124 are used to control the application of air pressure to the brake mechanisms for wheels 23, 25, 97, and 99 in addition to trailer wheels 96 and 98 and tractor wheels 36 and 38. Thus, wheels 23, 25, 97, and 99, in addition to tractor wheels 36 and 38 and trailer wheels 96 and 98, are prevented from locking up during application of the brakes as long as front wheels 22 and 24 of tractor 116 are free to rotate.

Figure 4:
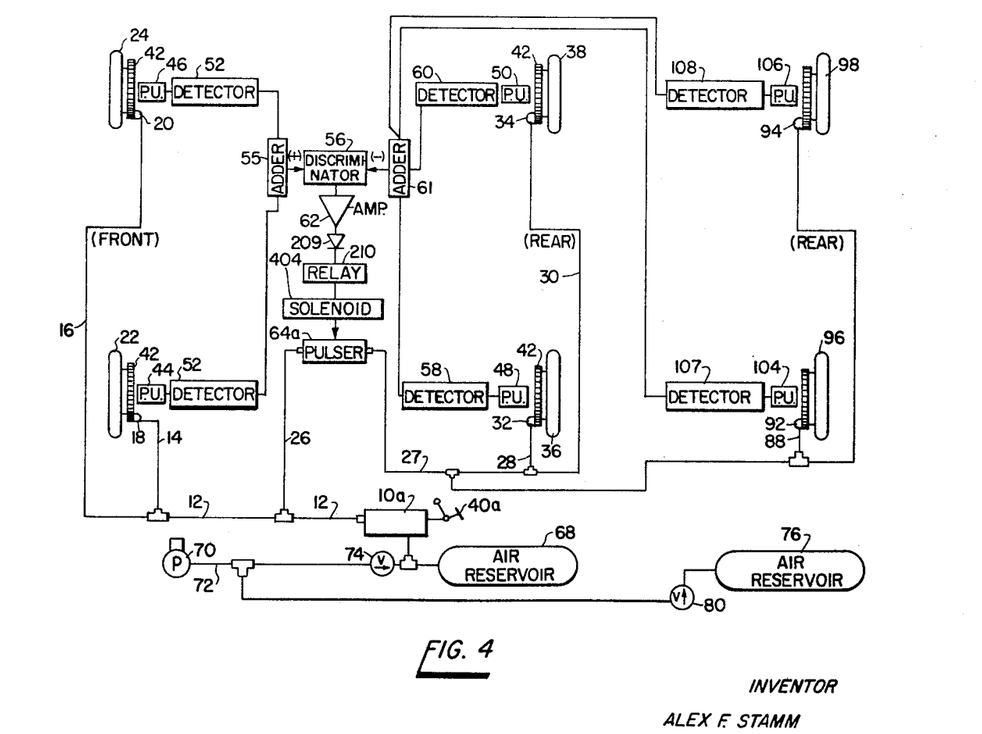
FIGURE 4 schematically illustrates another modification of this invention.

FIGURE 4 schematically illustrates a modified brake system which is similar in some respects to the brake system shown in FIGURE 2. To the extent that the system shown in FIGURE 4 is the same as the previously described brake systems, like reference characters have been used to identify like parts.

As shown in FIGURE 4, the output signals produced by detectors 58, 60, 107, and 108 are arbitrarily chosen to have negative polarities and are fed to adder circuit 61. The resulting output signal produced by adder circuit 61 and fed to discriminator 56 for comparison with the positive signal fed from adder circuit 55 will also be negative. The positive signal produced by adder circuit 55 is proportional to the summation of the rotational speeds of front wheels 22 and 24 as previously explained. With this arrangement, therefore, pulser 64a will be activated if the rotational or tangential velocity of at least one of the rearwardly disposed wheels 36, 38, 96, and 98 is relatively reduced so that an unbalance of predetermined magnitude develops between the positive and negative adder circuit signals compared by discriminator 56.

In the embodiment of FIGURE 4, brake cylinders 32, 34, 92, and 94 are all connected to the outlet port of pulser 64a. Actuation of pulser 64a therefore interrupts fluid communication between valve 10a and brake cylinders 32, 34, 92, and 94 and to exhaust the pressurized air for uniformly releasing brakes 32a, 34a, 96a, and 98a. As previously described, pulser 64a is actuated by energizing of relay 210, and relay 210 is energized when discriminator 56 produces an output signal of predetermined magnitude which represents a predetermined difference between the compared positive and negative adder circuit output signals.

Figure 5:
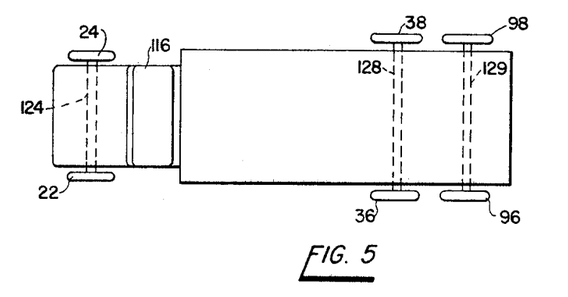
FIGURE 5 is a partially schematic plan view of a commercial vehicle having a two-axle tandem rear wheel arrangement and incorporating the brake system shown in FIGURE 4.

The brake system of FIGURE 4 may advantageously be applied to the vehicle shown in FIGURE 5 wherein wheels 22 and 24 are mounted on the front axle 124 as previously described and wherein wheels 36 and 38 and wheels 96 and 98 are respectively mounted on rear axles 128 and 129.

Figure 6:
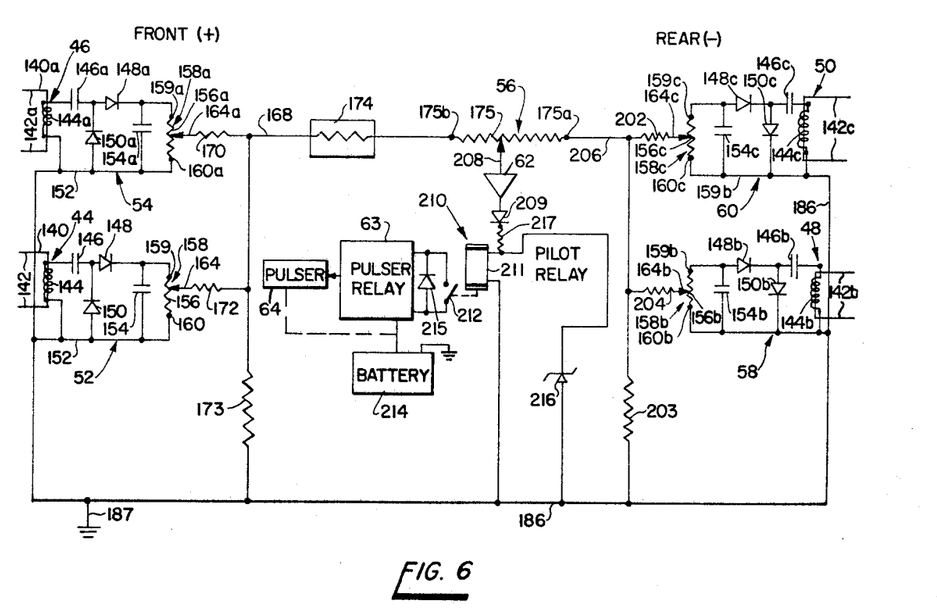
FIGURE 6 is a circuit diagram for the brake system shown in FIGURE 1.

Referring now to FIGURE 6, which illustrates the details of the circuitry shown in FIGURE 1, transducer 44 comprises a permanent magnetic core member 140 having pole pieces 142 disposed in close proximity to teeth 43 on the brake drum for wheel 22. Rotation of wheel 22 therefore varies the flux density in core member 140 to induce an undulating or alternating current voltage signal in a pick-up coil 144. One terminal of coil 144 is connected through a capacitor 146 to the rectifying network of detector 52 which comprises a diode 148 connected in series with capacitor 146 and another diode 150. Diode 150 is connected between the output terminal of capacitor 146 and an electrical conductor 152. The terminals of coil 144 are respectively connected to conductor 152 and to the input terminal of capacitor 146. A capacitor 154 forming a part of the rectifying network is connected between the cathode of diode 148 and conductor 152. The resistor 156 of a potentiometer 158, which provides the output for the rectifying network, is connected in parallel circuit relation with capacitor 154. An alternating current voltage across coil 144 causes a corresponding direct current voltage to appear across the terminals of resistor 156 in a manner well known in the art.

The terminal 159 of potentiometer 158 is at all times positive in relation to terminal 160, and the current flowing through resistor 156 depends upon the time constant of the RC network formed by resistor 156 and capacitor 154. This time constant is determined by the time required by capacitor 154 to discharge through the potentiometer. When the frequency of the alternating current generated in coil 144 increases, the peak intensity of the voltage from terminal 159 to terminal 160 of the potentiometer also increases and the direct current positive voltage picked up at slider 164 of potentiometer 158 varies as a function of the tangential or rotational speed of front wheel 22.

The circuitry for transducer 46 and detector 54 is the same as that just described for transducer 44 and detector 52. Accordingly, like reference characters have been used to identify like components, except that the reference characters for transducer 46 and detector 54 have been suffixed with the letter "a."

Operation of transducer 46 and detector 54 is the same as that just described for transducer 44 and detector 52. Thus, alternating current signals induced in coil 144a produce a positive direct current voltage across the terminals of potentiometer 158a.

The direct current voltage signals across potentiometers 158 and 158a, which are respectively representative of the tangential or rotational velocities of front wheels 22 and 24, are applied to sliders 164 and 164a. Sliders 164 and 164a are respectively connected through resistors 170 and 172 to a conductor 168. Conductor 168 connects corresponding terminals of resistors 170 and 172 to one terminal of a temperature sensitive resistor or thermistor 174 which has its other terminals connected to a voltage divider resistor 175. Resistor 175 along with a wiper or slider 208 form the circuitry for discriminator 56. Resistor 173 together with resistors 170 and 172 form the adder circuit 55 and are so connected that the adder circuit output signal is related to the sum of the two input signals.

With certain exceptions to be described shortly, the circuits for transducers 48 and 50 and detectors 58 and 60 are the same as that just described for transducers 44 and 46 and detectors 52 and 54. Accordingly like reference characters suffixed by the letter "b" have been used to identify the components for transducer 48 and detector 58, whereas like reference characters suffixed by the letter "c" have been used to identify the components for transducer 50 and detector 60.

These circuits associated with rear wheels 36 and 38 are the same as those associated with front wheels 22 and 24 except that the connection to the anodes and cathodes of diodes 150b, 150c, 148b, and 148c are reversed. Terminals 160b and 160c and the corresponding terminal of coils 144b and 144c, diodes 150b and 150c, and capacitors 154b and 154c are all connected by a common conductor 186 to a source of reference potential such as the ground indicated at 187. Conduit 152 also connects terminals 160 and 160a, and the corresponding terminals of diodes 150 and 150a, coils 144 and 144a, and capacitors 154 and 154a to the same reference potential. With this circuitry, therefore, the voltages impressed across potentiometers 158b and 158c are negative and are thus polarized oppositely with respect to the voltages across potentiometers 158 and 158a.

Still referring to FIGURE 6, sliders 164b and 164c are respectively connected through resistors 202 and 204 to terminal 175a of resistor 175. The opposite terminal 175b of resistor 175, as previously described, is connected through resistor 174 to corresponding terminals of resistors 170 and 172.

The rectified negative voltage signals, which are on sliders 164b and 164c and which represent the tangential or rotational velocities of wheels 36 and 38 respectively, are thus fed through resistors 204 and 202 and also through a resistor 203. The terminals of resistors 202 and 204 which are connected to terminal 175a are connected through resistor 203 to conductor 186. Resistors 202, 203, and 204 thus form adder circuit 61 which functions in the same manner as adder circuit 55.

Sliders 164, 164a, 164b, and 164c are selectively adjustable to provide a symmetrically balanced voltage differential across resistor 175 prior to operation. After sliders 164, 164a, 164b and 164c are adjusted, slider 208, which has wiping contact with resistor 175, is adjusted to a position where the voltage signal on it is zero when the absolute values of the two opposed voltage signals applied to terminals 175a and 175b are equal.

Thus, the voltage signal on slider 208 will be zero whenever the sum of the voltage signals on sliders 164 and 164a is equal and opposite in sign to the sum of the voltage signals on sliders 164b and 164c. This condition will exist when rear wheels 36 and 38 have the same tangential or rotational velocity as front wheels 22 and 24. However, as soon as one or both of the rear wheels 36 and 38 begins to rotate slower without a corresponding decrease in the rotational velocity of either or both of the front wheels 22 and 24, the positive voltage signal applied at terminal 175b will be correspondingly greater in absolute magnitude than the voltage applied to terminal 175a. As a result, a positive voltage signal will be impressed on slider 208 and fed to amplifier 62 where it is amplified and fed through a branch circuit containing a forwardly directed diode 209 and an operating winding 211 of pilot relay 210. Winding 211, diode 209, amplifier 62 and slider 208 are connected in series circuit relation between resistor 175 and conductor 186.

Diode 209 prevents energization of relay 210 when a negative voltage signal is applied to slider 208. This condition will occur if front wheels 22 and 24 are locked and rear wheels 36 and 38 are still rotating. A positive voltage signal on slider 208, however, is fed through diode 209 to winding 211.

As the difference between the voltages at terminals 175a and 175b increases as a result of one or both rear wheels 36 and 38 being rotated at a slower velocity, the positive voltage on slider 208 increases until it reaches such a value that sufficient current is caused to flow through winding 211 to operate relay 210. This energization of relay 210 causes energization of pulser relay 63 which, in turn, activates pulser 64 in the manner previously described. Actuation of pulser 64 pulses the fluid pressure applied to cylinders 32 and 34 to reduce the braking power applied to wheels 36 and 38.

Resistor 174, which is connected in series with the positive leg or resistor 175, has the effect of increasing the speed differential required to activate pulser 64 as vehicle speed increases, thus making the pulser less sensitive to slight variances between wheel speeds when braking routinely at high speeds. This will subsequently be explained in detail.

The electric power for operating both pulser relay 63 and pulser 64 is supplied by a battery 214. A Zener diode 216 is shunted around winding 211 to protect it by becoming conductive in the event that the voltage across the winding becomes large enough to cause damage. Diode 216 thus limits the voltage across winding 211 to a safe value. Relay 210 has a set of contacts 212 which are closed by energizing winding 211. A diode 215 is connected across the terminals of contacts 212 to protect the switch contacts from excessive arcing as the contacts make the break. A limiting resistor 217 is connected in the circuit as shown to protect diode 216 from dangerous current flow.

Figure 7:
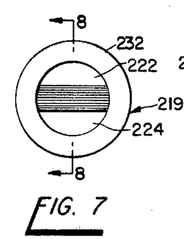
FIGURE 7 is a partially schematic front view of a modified form of speed-detecting, pickup unit for use in this invention.
Figure 8:
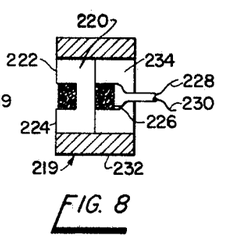
FIGURE 8 is a section taken substantially along lines 8—8 of FIGURE 7.

FIGURES 7 and 8 illustrate an electromagnetic transducer 219 which may be used in place of the transducers previously described. Transducer 219 has a permanent magnet core 220 which may be U-shaped to provide pole faces 222 and 224. Preferably, this core is made from a highly magnetic material such as Alnico. A coil 226 is wound around core 219a as shown. Transducer 219 may be mounted in a tubular casing 232 which is preferably made from a suitable magnetic shielding material. All the voids of the assembly such as shown at 234 may be filled with a potting material glass, epoxy or the like. The potting material also acts as a cement or binding agent to rigidly hold the components of transducer 219 in place.

When transducer 219 is used in place of transducers 44, 46, 48, and 50, the movement of teeth 43 past the region of core 220 produces a series of voltage pulses in winding 226. The frequency, amplitude, and pulsewidth of these pulses will be proportional to the tangential or rotational velocity of its associated wheel. These pulses are transmitted through the associated detector to the discriminator in the manner previously described.

Figure 9:
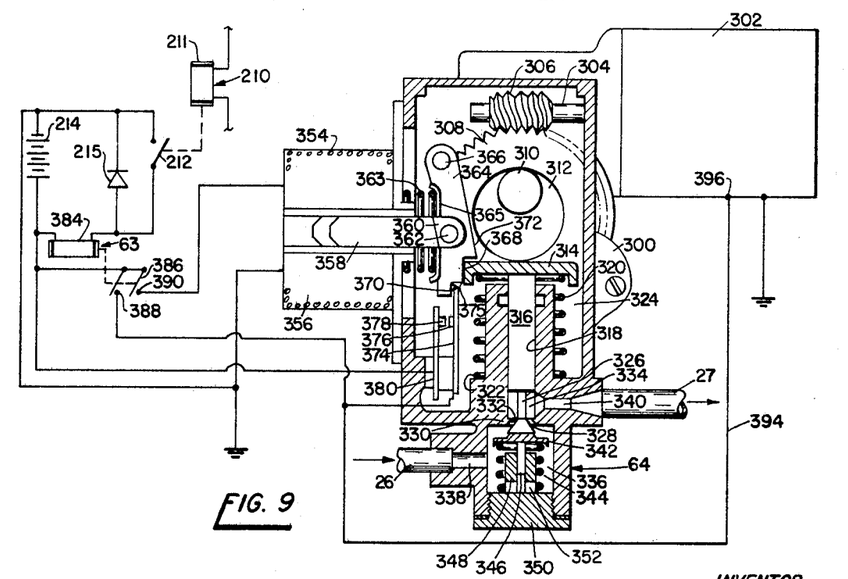
FIGURE 9 is a partially schematic, partially sectioned view of the pulser in FIGURE 1.

Referring now to FIGURE 9, pulser 64 is shown to comprise a housing 300 on which an electric motor 302 is mounted. Motor 302 has an output shaft 304 on which a helical gear 306 is fixed. Gear 306 constantly meshes with a gear 308 which is keyed on a shaft 310. An eccentric cam 312 is mounted on shaft 310 and has a lobe normally engaging a plate 314. Plate 314 is mounted on the end of a plunger 316 which slidably extends into a bore 318. Bore 318 is formed in housing 300. A coiled spring 320 disposed between plate 314 and a shoulder 322 in an internal housing cavity 324 urges plate 314 and plunger 316 upwardly. The lower end of plunger 316 is adapted to separably engage the upper end of a rod 326. Rod 326 and plunger 316 are axially aligned in bore 318.

Mounted on the lower end of rod 326 is a conical valve closure member 328. An annular wall 330 at the lower end of bore 318 provides a frusto-conical seat 332 which valve member 328 is adapted to matingly engage to interrupt fluid communication between chambers 334 and 336. Chamber 336 is formed in the lower end of housing 300 and communicates through a port 338 with conduit 26. Chamber 334 is defined by the lower end of bore 318 and communicates through a port 340 with conduit 27. Operation of valve member 328 therefore controls fluid communication between conduits 26 and 27.

Still referring to FIGURE 9, a coiled spring 344 disposed in chamber 336 reacts against a plug 350 to bas a retainer plate 342 upwardly. Valve member 328 is mounted on plate 342. The bias exerted by spring 344 thus urges valve member 328 upwardly towards its closed position. Plate 342 is fixed to a plunger 346 which slidably extends into a guide bushing 348.

Radial openings 352 formed in bushing 348 communicate with the longitudinal bore which receives plunger 346. This construction prevents the accumulation of brake fluid below the lower end of the plunger.

Bushing 348 is fixed to plug 350 which is threaded into housing 300 to delimit chamber 336. As shown, spring 344 peripherally surrounds bushing 348.

A solenoid 354 mounted on one side of housing 300 comprises a coil 356 which receives one end of a plunger 358. The opposite end of plunger 358 extends into housing 300 and is bifurcated as indicated at 360. A latch member 364 is pivotally connected to the bifurcated end 360 by a pin 362. Latch member 364 is pivotally mounted on a pin 366 which is fixed to housing 300. Axial displacement of plunger 358 swings latch member 364 about the axis of pin 366. At its end opposite from pin 366 latch member 364 is formed with two notched or stepped edges 368 and 370.

As viewed from FIGURE 9, edge 368 is biased into engagement with the side of plate 314 by a coiled spring 363. Spring 363 peripherally surrounds plunger 358 and bears against a retainer plate 365 to bias plunger 358 to the right and thus urge latch member 364 in a counterclockwise direction about the axis of pin 366. When coil 356 is energized, plunger 358 is displaced to the left to swing member 364 in the opposite direction against the bias exerted by spring 363.

As shown, latch member 364 is formed with an abutment 372 extending from edge 368 and being biased by spring 363 to a position where it latches over plate 314. When coil 356 is deenergized, therefore, upward displacement of plate 314 from the position shown in FIGURE 9 is prevented by engagement with the downwardly facing edge of abutment 372. In this position of latch member 364, edge 370 is biased by spring 363 into engagement with a cantilever-mounted spring leaf 374.

Leaf 374 carries a contact 376 which is moved out of engagement with a fixed contact 378 when edge 370 is biased into engagement with the free end of leaf 374. Contact 378 is mounted on a rigid support member 380 which is fixed to housing 300. Thus, when coil 356 is deenergized, contacts 376 and 378 are held open. When coil 356 is energized, plunger 358 is displaced to the left, to swing latch member 364 to the left, thereby freeing plate 314 for upward movement and allowing engagement of contact 376 with contact 378.

When pilot relay 210 is energized as a result of passing a predetermined current through winding 211, switch 212 closes to complete a circuit for allowing current to flow from battery 214 to energize winding 384 of pulser relay 63. Energization of relay 63 closes a double throw switch 386 to complete a circuit through a terminal 388 and a conduit 394 for energizing motor 302. Closing of switch 386 simultaneously completes a circuit through a second terminal 390 to energize coil 356. By energizing motor 302 cam 312 is rotated and bears down upon plate 314, cyclically urging it and plunger 316 in a downwardly direction against the bais exerted by spring 320. This relieves latch member 364 of any load, and spring 363 is compressed as plunger 358 is displaced to the left by energizing coil 356. Latch member 364 thus swings to the left, free from interference with the cam imparted movement of plate 314.

Release of latch member 364 allows contacts 376 and 378 to engage. Closing of contacts 376 and 378 provides a holding circuit for motor 302. The purpose of this holding circuit, as will be described in detail later on, is to control the sequence in which solenoid 354 and motor 302 are deenergized to thereby assure that components of pulser 64 will return to the "ready" position shown in FIGURE 9.

Rotation of cam 312 in cooperation with spring 320 imparts reciprocal movement to plate 314, plunger 316 and valve member 328. For each revolution of cam 312 valve member 328 will close and open.

The reciprocation of plunger 316 in bore 318 causes chamber 334 to increase and decrease in volume according to the direction of the displacement of the plunger. Consequently, as soon as valve member 328 engages seat 332 and fluid communication is cut off between chambers 336 and 334, pressure is reduced in the chamber 334 due to the continuing upward displacement of plunger 316. As a result, the fluid pressure applid to the rear wheel brake cylinders 32 and 34 is decreased. The pressure of the fluid in chamber 334 is then increased by the next downward motion of plunger 316 until full pressure is reapplied to the brake cylinders when valve member 328 opens to place chamber 336 again in fluid communication with chamber 334. In this way, the fluid pressure in conduit 27 is pulsated to reduce the effective braking torque applied to the rear wheels. This allows the rear wheels to regain speed until the summation of their rotational speeds practically equals the summation of rotational speeds of the front wheels. When this condition occurs, the voltage signal on slider 208 goes to zero with the result that relay 210 deenergizes to open contacts 212. Opening of contacts 212 deenergizes relay 64 to open switch 386. Opening of switch 386 deenergizes coil 356 to allow spring 363 to bias member 364 to its latching position shown in FIGURE 9.

However, motor 302 continues to remain energized after switch 386 opens due to the holding circuit provided by contacts 376 and 378. This is done to assure that pulser 64 will always assume the "ready" position as shown in FIGURE 9 so as to be properly positioned for operation in the next braking cycle, regardless of the relative position of plate 314 with respect to the latch member 364 at the instant solenoid 354 is deenergized. If plate 314 is sufficiently depressed by cam 312 at the instant solenoid 354 is deenergized, latch member 364 will move to the right under the bias exerted by spring 363 and thus swing to its illustrated "ready" position free from interference with the extreme left-hand vertical surface 375 of plate 314. As the latch member 364 swings to the right, edge 370 engages member 374 to thereby open contacts 376 and 378 and interrupt the holding circuit for motor 302. Plate 314 then moves upwardly under the bias exerted by spring 320 and continued inertial rotary movement of the motor until it assumes its illustrated "ready" position. Motor 302 may stop in any random position. If, on the other hand, latching movement of member 364 occurs at such a time when plate 314 is at or near the upper end of its stroke, abutment 372 will engage surface 375 to limit the movement of member 364 to the right. This limited movement of member 364 is not sufficient to open contacts 376 and 378. Motor 302 will thus remain energized until such time that plate 314 is shifted downwardly by cam 312 by a sufficient distance to allow member 364 to resume its movement to the right to the position shown in FIGURE 9. During this resumed motion, edge 370 will engage the end of leaf 374 to open contacts 376 and 378 and thereby deenergize motor 302. Plate 314 is now in its illustrated "ready" position owing to the bias exerted by spring 320 and inertial rotary movement of motor 302 after it deenergizes.

From the foregoing it will be appreciated that the pulsing frequency is a function of the speed of motor 302 and is preferably about 5 to 6 cycles per second.

Referring again to FIGURE 6, temperature sensitive resistor 174 is a positive coefficient resistor; that is, it is a resistor whose electrical resistance increases with its temperature. It thus will be appreciated that when the speed of the vehicle increases and the voltage of the alternating current signals generated by the front wheel transducers 44 and 46 correspondingly increases, the increased rectified current flow through resistor 174 causes the temperature of resistor 174 to increase. The resulting increase in resistance thus reduces the positive voltage applied to resistor 175.

Consequently, it will take a more negative voltage signal corresponding to the rate of rotation of the rear wheels of the vehicle to counterbalance the positive direct current voltage signal indicative of the rate of rotation of the front wheels, with the result that a sufficient current flow occurs through diode 209 and winding 211 of pilot relay 210 to close the contacts only when the difference between the speed of the front wheels and the speed of the rear wheels is greater than would be the case if the temperature sensitive resistor 174 was not included in the circuit. In this manner, it can be seen that the sensitivity of the circuit decreases somewhat with the speed of travel of the vehicle, so that at high speeds a certain tendency to lockup of the rear wheels will be accepted before the pulser begins to operate, while at a low speed, the pulser will begin to operate as soon as the rotation of the rear wheels, during brake application, decreases by a small amount below the speed of rotation of the front wheels. The use of the aforesaid device is optional.

It is evident that temperature sensitive resistor 174 is not essential and may, if desired, be omitted. It is also evident that, in order to further decrease the sensitivity of the system at high speed, a negative coefficient resistor could be connected in line 206 between resistor 175 and the common junction of resistors 202, 203 and 204.

This same effect may be achieved by employing a difference amplifier with one input derived from the discriminator output and the other connected to receive a fraction of front wheel adder output.

Pulser 64, as illustrated in FIGURE 9, is particularly applicable to a static hydraulic brake system such as the systems commonly used in passenger vehicles and small trucks. Such a conventional system is illustrated schematically in FIGURE 1. Pulser 64, because of the variable pulsating volume of chamber 334, pulses the hydraulic pressure being applied to brake cylinders 32 and 34, by alternately removing and restoring to cylinders 32 and 34 a predetermined amount of fluid in a closed hydraulic circuit.

It is also evident that where a higher degree of brake control is desired, a pulser may be disposed in each line connected to the inlet of each rear wheel brake cylinder, with appropriate discriminators and control systems permitting the fluid pressure applied to each brake cylinder to be pulsed, during a brake application, as soon as each wheel on any of the rearward axles of a motor vehicle, or the axle of the trailer being towed by a tractor, is caused to slow down relative to the rotational velocity of the front axle wheel set.

It is to be noted that the adding effect of the adder networks (i.e. circuits 55 and 61 in FIGURES 1 and 4 and circuits 55, 61, 103, and 110 in FIGURE 2) has the effect of cancelling out the normally encountered wheel speed difference when cornering. Each of the above-mentioned adder circuits, it will be appreciated, has the effect of numerically adding the input signals and dividing the sum by a constant so that the adder output signal represents the summation of the input signals. If the vehicle of FIGURE 1 is being turned to the right, for example, wheels 24 and 38 will both rotate at corresponding speeds which are correspondingly less than the rotational speeds of wheels 22 and 36. The fact that wheel 38 is rotating slower does not activate pulser 64 since the summation of front wheel voltage signals added together by adder circuit 55 will be equal and opposite with respect to the summation of rear wheel voltage signals added together by adder circuit 61.

It is also apparent that two or more pulser pistons may be pulsed by a single motor unit for use in a split brake system.

Figure 10:
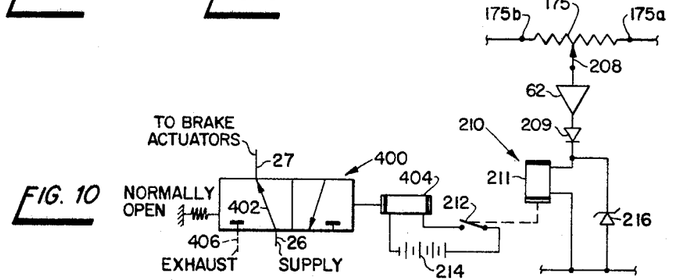
FIGURE 10 is a schematic view of the pulser shown in FIGURES 2 and 4.

For the air braking systems described in FIGURES 2 and 4, pulser 64a and pulser 114 may be any one of a number of commercially available solenoid-operated, spring-offset three-way air valves such as valve 400 schematically illustrated in FIGURE 10. Valve 400 is a normally open three-way valve in that it has an internal passage 402 which normally provides for fluid communication between conduits 26 and 27. When either of the pedals 40a in FIGURE 2 or FIGURE 4 is depressed to establish fluid communication between the air reservoir and conduit 26, therefore, compressed air will flow through passage 402 and into conduit 27 to actuate the rear wheel brake cylinders. When the average tangential or rotational velocity of any set of wheels disposed rearwardly of the front axle falls below the average velocity of the front wheels, however, pilot relay 210 will be energized in the manner previously described to close contacts 212. Closure of contacts 212 completes a circuit to energize a solenoid 404. Solenoid 404 is suitably connected to the movable valve operating member of valve 400. When energized, solenoid 404 operates valve 400 to a position where conduit 27 is disconnected from conduit 26 and connected to an exhaust port 406.

The air pressure in conduit 27 is thus exhausted, and the rear wheel brakes are released allowing the average velocity of the rear wheels to effectively catch up with the average speed of the front wheels, at which time relay 210 is deenergized to open contacts 212 and deenergize solenoid 404 allowing the air under pressure once again to flow freely from conduit 26 through passage 402 to conduit 27. If this second application of air pressure to the brake cylinders still is excessive for the existing conditions and there again is excessive deceleration of one or more of the rear wheels 36 and 38, solenoid 404 will again be energized causing the air applied to the brakes to be exhausted through port 406 to the atmosphere as described above. This "pulsing" action will continue automatically as long as brake pedal 40a remains depressed and the excessive deceleration of one of the rear sets of wheels continues to occur for the given pressure applied to the actuators.

From the foregoing description it is clear that this invention provides for a brake system wherein the rotation of the wheels of any axle may be compared with the rotation of the wheels of any other axle so that as soon as the wheels on one axle tend to rotate at a slower speed than the wheels on the other axle during braking, the control fluid pressure of the brake cylinders of the slowed wheels will be pulsed until their rotational velocity has again increased to the same rotational velocity as the axle acting as a reference.

Figure 11:
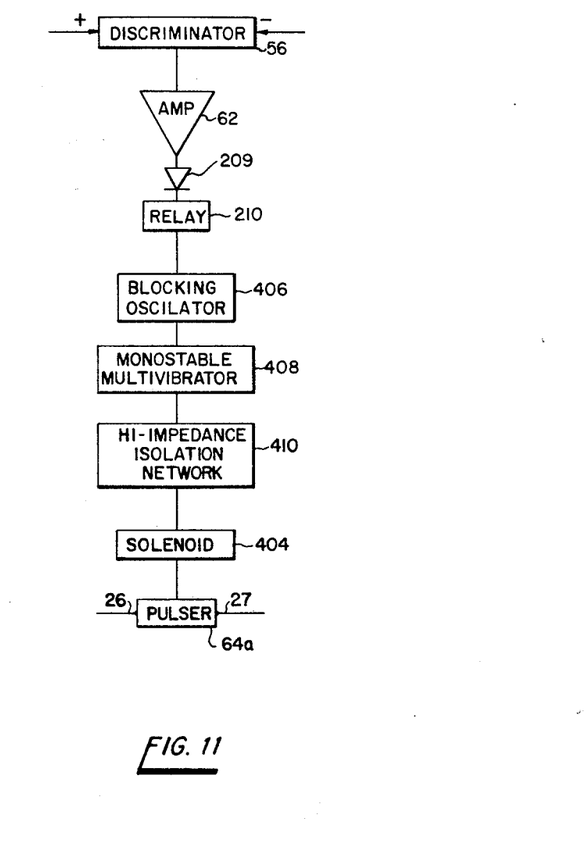
FIGURE 11 is a schematic view of a modified circuit for pulsating air at a fixed rate in an air pulser brake system.

In comparing the hydraulic brake pulser system of FIGURE 1 of the application with the air pulser brake systems of FIGURES 2 and 4 it is noted that the hydraulic system is pulsed at a fixed rate, a definite number of cycles per second, when the discriminator 56 produces an output signal of sufficient magnitude to actuate pilot relay 212. The air brake system, however, does not pulsate the fluid pressure when the rear wheels are under control of the front wheel set. Instead in the air brake system the presurized air actuating the rear brake cylinders is exhausted and no new pressure is applied until the rear wheel speed is brought up to the speed of the front wheels, at which time full air pressure is again applied to the rear brake cylinders. However should it be desired it is possible to pulse the air brake system at a predetermined fixed rate. The simple block diagram of FIGURE 11 illustrates how the systems disclosed in FIGURES 2 and 4 may be modified to accomplish this result.

Assuming the discriminator 56 is producing a positive output signal in the usual manner, pilot relay 210 will be energized producing a signal which will trigger blocking oscillator 406. The blocking oscillator 406 will generate, and continue to generate as long as the pilot relay 210 remains energized, a series of pulses at a fixed rate, preferably 3 to 5 cycles per second. This pulsing rate is slightly lower than the corresponding rate for the hydraulic pulser (5 to 6 c.p.s.) due to inherent mechanical limitations in exhausting air from the valve pulser 64a at a faster rate.

The output signal of the blocking oscillator is fed to a monostable multivibrator 408, also commonly referred to as a "flip-flop," which is used to generate a square wave output from the blocking oscillator pulses. This square wave output of the multivibrator 408 is directed to a high-impedance isolation network 410 from where it is fed to solenoid 404 which then operates to apply and release air pressure to the rear brake cylinders by regulating air flow within pulser 64a in the manner earlier described in conjunction with FIGURE 10.

All of the individual components of "the automatic pulse generator" described above are well known in the art.

The invention may be embodied in other specific forms without departing from the spirit or essential characteristics thereof, The present embodiments are therefore to be considered in all respects as illustrative and not restrictive.

What is claimed and desired to be secured by Letters Patent is:

1. In combination with a vehicle braking system having selectively operable fluid pressure actuated front and rearward brake sets for a front ground-engaging vehicle wheel set and at least one rearwardly disposed ground-engaging wheel set, the improvement comprising first means for controlling application of fluid pressure to one of said brake sets independently of fluid application to the other of said brake sets, and second means responsive to the rotational velocity of the one of said wheel sets associated with the other of said brake sets to render said first means less effective to control fluid pressure application as the rotational speed of said one wheel set increases.

2. In combination with a vehicle braking system having a fluid pressure actuated braking mechanism for a ground-engaging, vehicle wheel, an operator controlled fluid pressure source, and a fluid pressure circuit for transmitting fluid pressure from said source to actuate said mechanism, the improvement comprising a motor controlled device disposed in said circuit for repeatedly pulsing the fluid pressure applied to actuate said mechanism by cyclically blocking and providing fluid communication between said mechanism and said source during operator initiated fluid pressure actuation of said mechanism, said device comprising a valve member displaceable between positions where it blocks and provides fluid communication between said source and said mechanism, said combination further comprising a motor operatively connected to said valve member and being energizable to cyclically move said valve member between said positions, said device further comprising means correlated with the movement of said valve member for reducing the fluid pressure blocked between said valve member and said mechanism when said valve member is moved to its closed position, said device further comprising an eccentric rotated by energization of said motor and said pressure reducing means comprising a plunger operatively connected between said eccentric and said valve member for imparting rotary movement of the former to reciprocate the latter between said positions, said plunger being reciprocated by said eccentric and being so disposed in said circuit as to increase the volume of said circuit between said valve member and said mechanism as said valve member is moved towards its closed position.

3. The combination defined in claim 2 wherein said device further comprises a latch releasably retaining said valve member in its opened position when said motor is deenergized and a solenoid energizable simultaneously with energization of said motor for releasing said latch.

4. The combination defined in claim 3 wherein said device further comprises a holding circuit under the control of said latch and a part on said plunger for preventing deenergization of said motor until said valve member moves to its opened position.

5. In combination with a vehicle braking system having fluid pressure actuated front and rearward brakes for a front ground-engaging vehicle wheel set and at least one rearwardly disposed ground-engaging wheel set, an operator controlled fluid pressure source, and conduit means operatively connecting said front and rearwardly disposed wheel sets to said source, the improvement comprising a sensing device associated with each wheel in said sets for producing a voltage indicative of the tangential velocity of its associated wheel, an adder circuit associated with each wheel set and being operatively connected to the sensing devices for its associated set to produce an output voltage which is representative of the voltages produced by the connected sensing devices, a comparator circuit connected to the adder circuits for said front and rearward sets for producing a control voltage upon detection of a difference between the adder circuit voltages, and means operatively connected to said comparator circuit and being effective when said control voltage reaches a predetermined value and indicates that the rotational velocity of said rearwardly disposed wheel set is slower than that of said front wheel set during actuation of said front and rearward brakes to interrupt fluid communication between said rearward brakes and said source, and further comprising resistor means connected to the one of said adder circuits associated with said front wheel set for reducing the rate at which the output voltage of said one adder circuit increases in relation to the magnitudes of the associated sensing device voltages.

6. In combination with a vehicle brake system having selectively operable fluid pressure actuated forward and rearward brakes for a forward ground engaging wheel set and at least one rearwardly disposed ground engaging wheel set, the improvement comprising means for producing a reference signal continuously representative solely of the rotational speed of at least one wheel of one of said wheel sets, said signal being independent of the rotational speed of the wheels of the other of said sets, separate means for independently producing a second signal continuously representative solely of the rotational speed of at least one wheel of said other wheel set, comparator means, means for feeding each signal, unmodified by the other, continuously to said comparator means, said comparator means generating a control signal only when the speed of the wheel of said other set is less than the speed of the wheel of said one set, said comparator means being ineffective to generate a control signal when the speed of the wheel of said one set is equal to or less than the speed of the wheel of said other set, and means responsive to said control signal for relieving the brakes associated with said other wheel set independently of the brakes of said one wheel set while said brakes are selectively operated.

7. The combination defined in claim 6 wherein said one set is said forward wheel set and wherein said brake system further comprises an operator controlled fluid pressure source and first and second conduit means, respectively, connecting said forward and rearward wheel brakes to said source and wherein said last-mentioned means comprises a valve disposed in said second conduit means and being operative to control fluid communication between the rearward brakes and said source.

8. The combination according to claim 6 wherein said last-mentioned means is effective to pulse the fluid pressure supplied to the brakes associated with said other wheel set at a fixed predetermined rate.

9. The combination defined in claim 6 wherein said last-mentioned means comprises a device operable by said control signal for repeatedly pulsing the fluid pressure to actuate the brakes associated with said other wheel set by cyclically blocking and providing fluid communication between the said brakes and a source of said fluid pressure.

10. The combination as defined in claim 6 wherein said one wheel set is said forward set and said other wheel set is a rearwardly disposed wheel set.

11. In combination with a vehicle braking system having fluid pressure actuated front and rearward brakes for a front ground engaging vehicle wheel set and at least one rearwardly disposed ground engaging wheel set, an operator controlled fluid pressure source, and conduit means operatively connecting the brakes associated with said front and rearwardly disposed wheel sets to said source, the improvement comprising separate sensing devices each associated with one wheel in said set for producing a signal indicative solely of the tangential velocity of its associated wheel, a first circuit associated with the forward wheel set and being operatively connected to the sensing devices for the forward wheel set to produce an output signal which is representative solely of velocity of the wheels of said forward set, a second circuit associated with a rerawardly disposed wheel set and being operatively connected to the sensing devices for said rearwardly disposed wheel set to produce an output signal which is representative solely of the velocity of the wheels of said rearwardly disposed set, comparator means, means for feeding said first and second output signals, each unmodified by the other, continuously to said comparator means, said comparator means generating a control signal only when the speed of said rearwardly disposed wheel set is less than the speed of the front wheel set, said comparator means being ineffective to generate a control signal when the speed of said front wheel set is equal to or less than the speed of the wheels of said rearwardly disposed wheel set, and means responsive to said control signal for relieving the brakes associated with said rearwardly disposed wheel set independently of the brakes of said front wheel set while said brakes are selectively operated.

References Cited

UNITED STATES PATENTS

| | | |
|---|---|---|
| 3,235,036 | 2/1966 | Meyer et al. |
| 3,260,555 | 7/1966 | Packer. |
| 2,025,889 | 12/1935 | Pardee. |
| 3,089,734 | 5/1963 | Jankus. |
| 3,130,805 | 4/1964 | Carter et al. |
| 3,269,781 | 8/1966 | Van House. |

FOREIGN PATENTS

| | | |
|---|---|---|
| 706,298 | 3/1965 | Canada. |

MILTON BUCHLER, Primary Examiner

DUANE A. REGER, Assistant Examiner

U.S. Cl. X.R.

303—6